May 15, 1923.

W. W. DILLER

MOTOR AXLE DRIVE

Filed March 20, 1922

1,455,084

Inventor,
William W. Diller,
By
Joseph A. Minturn,
Attorney.

Patented May 15, 1923.

1,455,084

UNITED STATES PATENT OFFICE.

WILLIAM W. DILLER, OF INDIANAPOLIS, INDIANA.

MOTOR AXLE DRIVE.

Application filed March 20, 1922. Serial No. 545,335.

*To all whom it may concern:*

Be it known that I, WILLIAM W. DILLER, a citizen of the United States, residing at Indianapolis, in the county of Marion and State of Indiana, have invented new and useful Improvements in Motor Axle Drives, of which the following is a specification.

During the late war many hundreds of Nash trucks were acquired by the United States Government and consigned after the war for use by various States of the Union in road construction and maintenance. The road or traction wheels of these trucks were set oblique to the road surface and consequently to their axles, which required the introduction of universal joints in the driving shafts carrying pinions that engaged with internal gears in the road wheels. The universal joints have been found to be short-lived and impractical so that most of the trucks containing them have been abandoned.

The object of this invention is to eliminate the universal joints in the shaft transmission and to restore the trucks to their intended usefulness, all of which I have accomplished under actual working conditions by the mechanism illustrated in the accompanying drawings, in which—

Figure 1:
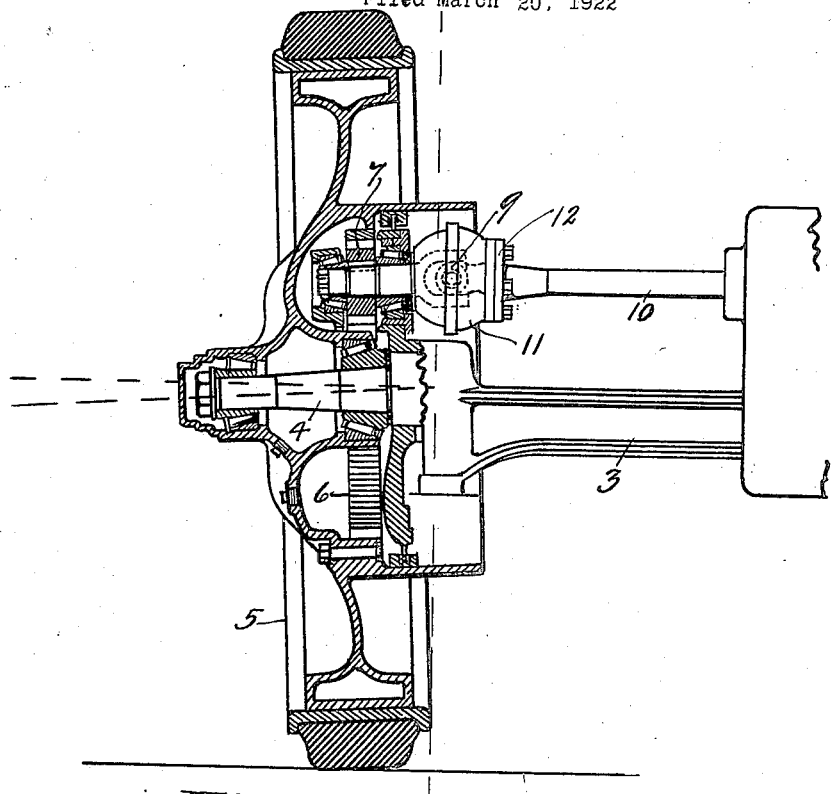
Figure 2:
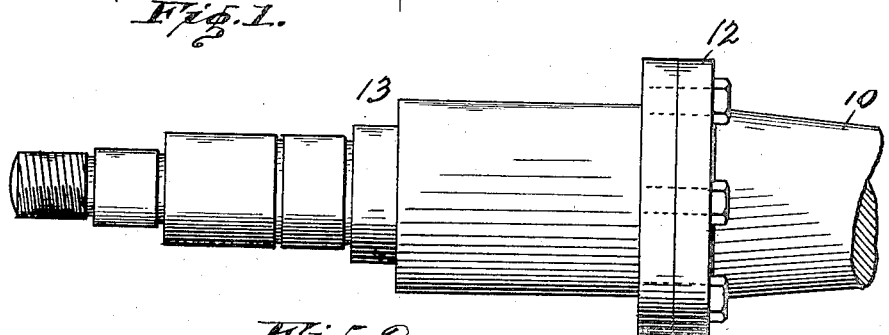

Fig. 1 is a vertical cross section of a road wheel with axle and power transmission embodying the faulty Nash construction, and Fig. 2 is a view on a larger scale of my substitute for the universal joint.

Like characters of reference indicate like parts in the two views.

The axle 3 has the stub-end 4 bent down as shown by the dotted lines to cant the wheel 5 out of vertical position to the extent indicated by the vertical dotted lines in Fig. 1. This shows the construction as the job left the factory. The wheel 5 has an internal gear 6 to which power is applied through a pinion 7, mounted on a stub which is connected by universal joint 9, shown in dotted lines in Fig. 1, with a drive shaft 10. This requires a housing 11 surrounding the joint to protect it from foreign matter. The stub is supported on roller-bearings on each side of the pinion which have their supports from the axle 3.

In my construction, the stubs 4 are straightened to bring the wheels 5 at right angles to the axle. This is done by heating the metal at the junction of the stub with the axle by means of a blow-torch and bending at the heated portion. This removes the necessity for a universal joint in the drive shaft 10. The member containing the universal joint in the original assembly is removably secured by bolts to a flange 12 and I remove all of the original structure from the flange 12 to the adjacent end and substitute a new stub 13 (see Fig. 2) having no universal joint, but otherwise suitably shaped, and reassemble thereon the pinion 7 which is fixed to the stub, and the roller bearings and races on each side of the pinion, as originally designed, and as shown in Fig. 1.

The pinion drivingly engages the internal gear 6, of wheel 5 with the universal joint and its housing omitted, and with the practical results which are entirely satisfactory in power transmission and which are greatly superior to the product turned out by the factory engineers in the matter of strength, maintenance and durability. My invention has enabled me to rehabilitate expensive trucks which otherwise were abandoned as inoperative for commercial use and to solve a problem in engineering which the factory was unable to solve.

Having thus fully described my invention, what I claim as new and wish to secure by Letters Patent is—

1. The herein described method of repairing motor trucks having an axle with downwardly bent ends and road-wheels thereon correspondingly oblique to a vertical plane and having a driving shaft drivingly connected with the wheels, said shaft having universal joints near each end, which consists, first, in removing the ground wheels from the axle, then substituting rigid joints for the universal joints in the driving shaft, then bending the axle until the driving mechanism connecting the shaft-ends and the wheels will function normally, and then securing the ground wheels on the axle.

2. The herein described method of repairing motor trucks having an axle with downwardly bent ends and road-wheels correspondingly oblique, and having a driving shaft with a pinion and bearings said pinion drivingly engaging an internal gear on the adjacent road-wheel, said shaft having end-members connected with the body of the shaft by rigid separable joints and also having a universal joint between each rigid joint and adjacent pinion, which consists in first removing the road-wheels, then removing the shaft members having the universal joints, then rigidly attaching a rigid end-member to each end of said shaft, then assembling a pinion and bearings on each rigid end-member, then heating and bending the axle until the pinions on the rigid shaft normally engage with the gears on the road-wheels, and then securing the road-wheels on the axle.

Signed at Indianapolis, Indiana, this the 13th day of March, 1922.

WILLIAM W. DILLER.